Dec. 8, 1970 — H. MAHN — 3,545,297

TRANSMISSION GEAR

Filed Oct. 16, 1968 — 2 Sheets-Sheet 1

INVENTOR.

BY HERBERT MAHN

AGENT

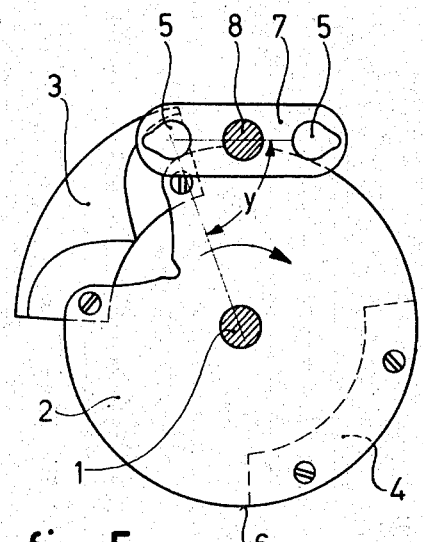
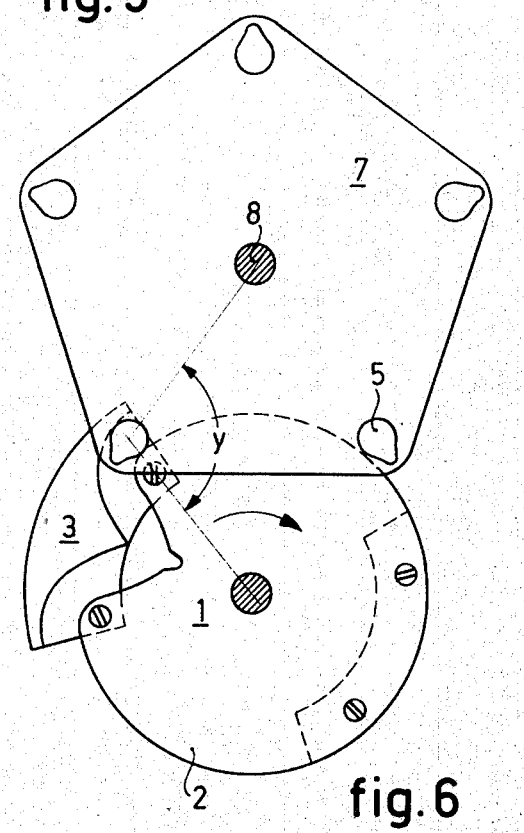

United States Patent Office 3,545,297
Patented Dec. 8, 1970

3,545,297
TRANSMISSION GEAR
Herbert Mahn, Hamburg, Germany, assignor, by mesne assignments, to U.S. Philips Corporation, New York, N.Y., a corporation of Delaware
Filed Oct. 16, 1968, Ser. No. 767,959
Claims priority, application Germany, Oct. 26, 1967, 1,650,811
Int. Cl. F16h 27/04, 55/04
U.S. Cl. 74—437                                              8 Claims

ABSTRACT OF THE DISCLOSURE

A transmission gear for converting uniform rotary motion of a driving shaft into nonuniform motion of a parallel driven shaft. On the driving shaft a disc has a curved groove including a kink, and on the driven shaft are teeth that cooperate with both the cylindrical edge of the disc and the groove therein to provide the desired motion, while preventing reverse relative motion of the shafts.

---

The invention relates to a transmission gear for converting the motion of a uniformly rotating driving shaft into a nonuniform and interrupted motion of a driven shaft; the driving shaft supports a cylindrical disc the head face of which is provided with at least one groove having parallel flanks, which groove extends from the circumference of the disc towards the centre thereof and returns towards the circumference after a kink; the driven shaft is arranged parallel to the driving shaft being connected to two or more teeth arranged at equal distances from the centre line of the shaft and cooperating with the said groove and, the two shafts are spaced apart over such a distance that two teeth engage the cylindrical part of the disc, when none of the teeth cooperates with the groove.

Known transmission gears of the kind described are the Geneva drive and spur gears. An advantage of these gears is that any feasible motion of the driven shaft can be obtained by choosing the variation of the groove, the run-in and run-out of the teeth being effected without jerks due to a tangential variation of the beginning and end of the groove. The driven shaft is then always turned one position further, the choice of the groove permitting to attain high switching frequencies, that is to say, quickly succeeding changes of position for small accelerations and hence slight wear. This kind of transmission gear is therefore particularly suitable for transporting punched tapes, magnetic tapes, etc., with a start-stop movement.

A drawback of these known transmission gears is, however, that a tooth is in an unstable situation at the kink when traversing the groove, that is to say, its direction of movement relative to the groove is not unambiguously determined and it is possible that the tooth returns to the circumference along the same part of the groove along which it moved towards the kink. This gives rise to a disturbance of the satisfactory operation of the transmission gear.

An object of the invention is to obviate this drawback and is characterized in that the flank of the groove which is closest to the centre of the disc, has a recess at the kink and that the teeth connected to the driven shaft have an out-of-round, radially oblong profile which can cooperate with the recess. The out-of-round profile of the teeth is now located in the recess at the kink in the groove and glides or rolls from the recess along the flanks so that the direction of movement of the teeth through the groove is unambiguously determined. The risk of reversal of the direction of movement is thus completely obviated.

The profile of the teeth and the recess may be manufactured by methods which are common practice in the gear wheel technique. The flanks of the recess and the flanks of the parts of the teeth cooperating therewith may advantageously vary in accordance with cyclic curves.

The parts of the groove located on either side of the kink may be symmetrical or may vary differently, the two flanks of the recess and those of the teeth accordingly being symmetrical or different.

In order that the invention may be readily carried into effect, it will now be described in detail by way of example, with reference to the accompanying diagrammatic drawing, in which:

FIGS. 5 and 6 are elevational views of two further embodiments of the transmission gear of FIGS. 1 to 4 having two and five teeth coupled to the driven shaft.

Figure 1:
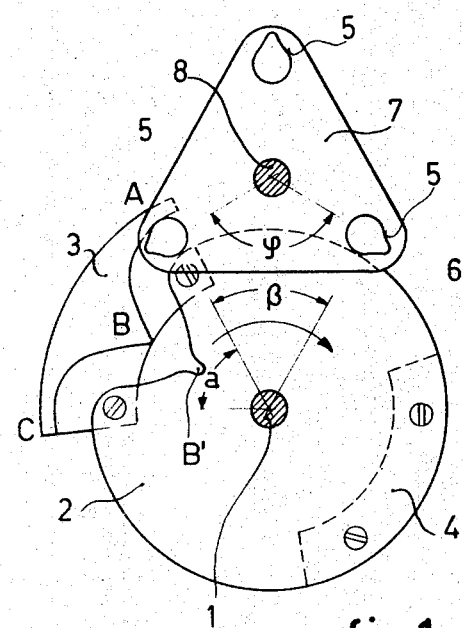
FIGS. 1 to 3 are elevational views of three positions of a transmission gear having one groove in three teeth connected to the driven shaft.
Figure 2:
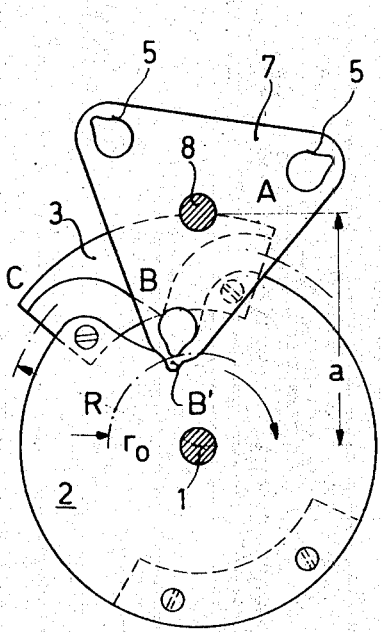
Figure 3:
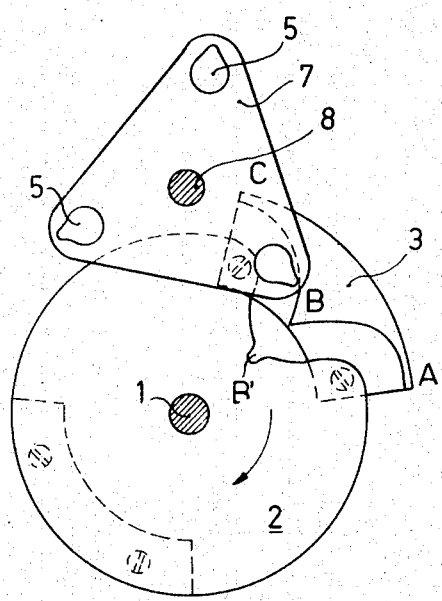
Figure 4:
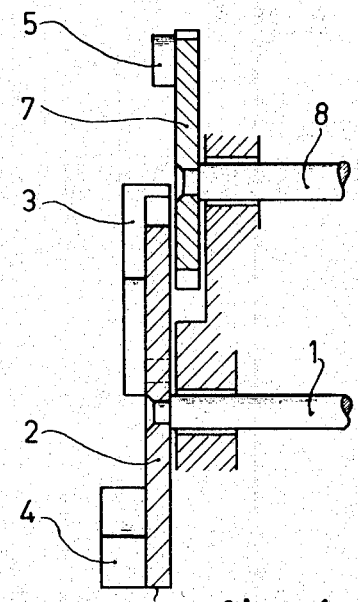
FIG. 4 is a side view of the transmission gear of FIGS. 1 to 3.

The operation of the transmission gear is shown in FIGS. 1, 2 and 3. A disc 2 is rigidly connected to the driving shaft 1. This disc supports a grooved body 3 having a groove ABC and a counterweight 4 and it rotates at a constant angular velocity. The teeth 5 engage alternately pairwise the cylindrical envelope 6 of the disc 2. The teeth 2 included by an angle $\varphi$ are arranged on a disc 7 which is rigidly connected to the driven shaft 8. Together with the disc 2 the grooved body 3 forms a groove ABC the beginning and end of which are located tangentially to the periphery of disc 2, and the beginning of which engages the relevant tooth 5 which is constrained to pass along a circular path between the shafts 1 and 8, said tooth travelling over an arc of ta circle $\varphi = 120°$. The nature of its movement is then determined by the variation of the groove.

The characteristic kink in the variation of the groove lies between the run-in A and the run-out C at B. At this area B the direction of movement of tooth 5 is not fixed if this tooth were round. In that case it could glide back to the run-out A under influence of external forces. An unambiguous determination of the direction of movement towards run-out C is obtained by giving the teeth 5 a sectional profile which is composed of a circle and a tooth the sectional surfaces of which hav a ratio of approximately 3:1. The tooth is then radially directed outwards. Prior to the cylindrical part of tooth 5 reaching the kink B the flank of the tooth glides into the toothlike recess B which is formed in the inner flank of the groove. From this ensures a normal meshing of the teeth so that the direction of movement of tooth 5 is fixed also at B.

The conversion of the accelerated movement of the driven parts into the delayed movement thereof also occurs at the kink B. This applies both to symmetrical and to asymmetrical movements of the driven shaft.

Although FIGS. 1 to 4 show three teeth arranged on the disc 7 it will be evident that this number may be chosen at will. Thus FIG. 5 shows, by way of example, a transmission gear having only two teeth 5 and FIG. 6 shows a transmission gear having five teeth. Furthermore, it will be evident that a plurality of grooves may be arranged if desired on the disc 2.

It may be evident from the foregoing that the present invention provides a transmission gear of the kind described hereinbefore in which the direction of movement of the nonuniformly rotating driven shaft is unambiguously determined at any position.

What is claimed is:

1. A transmission gear for converting the motion of a uniformly rotating driving shaft into a nonuniform and interrupted motion of a parallel driven shaft, comprising (a) a cylindrical disc secured on the driving shaft and provided with at least one groove having parallel flanks, which groove extends from the circumference of the disc towards the centre thereof and returns towards the circumference after a kind, (b) two or more teeth arranged on the driven shaft at equal distances from the center line of the shaft and cooperating with the said groove, the two shafts being spaced apart over such a distance that two teeth engage the cylindrical part of the disc when none of the teeth cooperates with the groove, and the flank of the groove which is closest to the centre of the disc has a recess at the kink and the teeth have radially oblong profile which can cooperate with the recess.

2. A transmission gear as defined in claim 1, wherein the flanks of the recess and the flanks of the parts of the teeth cooperating therewith vary in accordance with cyclic curves.

3. A transmission gear as defined in claim 1 wherein the parts of the groove located on either side of the kink are symmetrical, and the two flanks of the recess and those of the teeth are accordingly symmetrical.

4. A transmission gear as defined in claim 1 wherein the parts of the groove located on either side of the kink are nonsymmetrical, and the two flanks of the recess and those of the teeth are accordingly nonsymmetrical.

5. Apparatus as defined in claim 1 wherein the drive shaft includes thereon a generally triangular member fixed at its center to said drive shaft and said teeth being disposed on the triangle near each of its three corners, each tooth having an oblong profile with an axis extending radially outward.

6. Apparatus as defined in claim 5 wherein the groove in the driven disc has a width corresponding to the width of the oblong.

7. A transmission gear for converting uniform rotating motion of a driving shaft into nonuniform and interrupted motion of a parallel driven shaft while preventing reverse relative motion, comprising:
  (a) a drive member being secured to the driving shaft, this member having a drive surface formed partly as a circular path, and partly as an interruption path formed as a run-in from the circle's circumference and a similar run-out with an intermediate kink, the run-in path having predetermined width defined by parallel flanks, the kink part having greater width, and
  (b) a driven member being secured to the driven shaft and having at least 2 teeth at equal distances from the shaft axis, each tooth having an oblong-profile with width corresponding to that of the run-in part of the groove, and the length corresponding to the kink width, the shafts spaced apart such that alternately (1) two teeth engage the cylindrical part of the drive member simultaneously, and (2) one tooth enters the interruption path while no teeth engage the cylindrical part.

8. A device as defined in claim 7 wherein each oblong profile has a longitudinal axis extending radially outward.

References Cited

UNITED STATES PATENTS

| 1,990,684 | 2/1935 | Wright | 74—436 |
| 2,918,828 | 12/1959 | Dexter | 74—436 |

LEONARD H. GERIN, Primary Examiner

U.S. Cl. X.R.

74—84, 436

UNITED STATES PATENT OFFICE
CERTIFICATE OF CORRECTION

Patent No. 3545297      Dated December 8, 1970

Inventor(s) HERBERT MAHN

It is certified that error appears in the above-identified patent and that said Letters Patent are hereby corrected as shown below:

Col. 3, line 6, "kind" should be --kink-- line 14, before "radially" insert --a--

Signed and sealed this 7th day of September 1971.

(SEAL)
Attest:

EDWARD M. FLETCHER, JR.　　　　　ROBERT GOTTSCHALK
Attesting Officer　　　　　　　　Acting Commissioner of Paten